United States Patent [19]
Herriot

[11] Patent Number: 5,929,792
[45] Date of Patent: Jul. 27, 1999

[54] METHOD AND APPARATUS FOR ENCODING MULTIPLE CHARACTER SETS

[75] Inventor: Robert G Herriot, Palo Alto, Calif.

[73] Assignee: Sun Microsystems, Inc.

[21] Appl. No.: 08/885,017

[22] Filed: Jun. 30, 1997

[51] Int. Cl.[6] .................................................. H03M 7/00
[52] U.S. Cl. .............................................. 341/55; 341/95
[58] Field of Search ................................. 341/55, 95, 50

[56] References Cited

U.S. PATENT DOCUMENTS

| | | | |
|---|---|---|---|
| 5,389,924 | 2/1995 | Ogawa | 341/106 |
| 5,682,158 | 10/1997 | Edberg et al. | 341/90 |
| 5,687,366 | 11/1997 | Harvey, III et al. | 395/610 |

Primary Examiner—Marc S. Hoff
Attorney, Agent, or Firm—Charles E. Gotlieb

[57] ABSTRACT

Each character in a message is segregated into a range depending on the value of the character and encoded based on the range of the character. The encoding techniques may include removing all but the lowest byte, removing all but the lowest byte and masking one or more bits, base 64 encoding, base 64 encoding certain bits, and subtracting prior to base 64 encoding certain bits. To certain encoded characters is added a shift character, which can be used to determine how to decode the character. Multiple characters in the same range may be encoded and placed between a shift lock character and a shift unlock character, with the shift lock character used to determine how to decode the encoded characters. The encoded characters may be decoded using the encoded character, and the absence or presence of any shift, shift lock or shift unlock characters.

67 Claims, 10 Drawing Sheets

METHOD AND APPARATUS FOR ENCODING MULTIPLE CHARACTER SETS

FIELD OF THE INVENTION

The present invention is related to computer character set encoding and more specifically to Unicode encoding of multiple computer character sets.

BACKGROUND OF THE INVENTION

People communicate using characters. To encode these characters in a computer, encoded representations of each character are defined as standards. Sending and receiving computers using the same standards are thus able to communicate with each other: the receiving computer can display a copy of what was sent by the sending computer. The ASCII character set is an example of a standard character set used in a computer, although other standards such as EBCDIC have been used.

Different languages may be represented using different character sets. The ASCII character set is used to represent the English language. Other Latin-based languages may also be represented by the ASCII character set along with one or more standard character set extensions to provide a complete set of characters for the language. For example, the ASCII characters and other characters such as 'c' is used in France, but 'c' is not part of the ASCII character set. The standard Latin-1 supplement character set contains 'c' and thus supplements the ASCII character set for the French language.

Other languages are represented by a completely different character set. For example, the Hebrew language is written in characters different from those in the ASCII character set, and various Hebrew character set standards have been developed for communicating in Hebrew.

ISO, the international standards organization, has mapped many character sets, including symbol character sets, into two global character supersets, UCS-2 and UCS-4. The UCS-2 character superset uses two bytes to encode a wide variety of characters which might otherwise require multiple character sets. The upper bits of the two bytes of UCS-2 characters generally, though not always, define a group of related characters, such as Basic Latin characters, Hebrew basic and extended characters or Thai characters, and the lower bits defining the character within the group. A "byte" is any group of 8 bits, and is sometimes referred to in the art as an "octet". If both sender and recipient software uses UCS-2, communication is possible in a wide variety of languages using a wide variety of characters from different groups. Some languages would otherwise require the use of two or more character sets, so the UCS-2 superset standard of encoding may be used to represent the characters in each set.

The UCS-4 superset uses four bytes to represent characters, presently in the same manner as UCS-2. The UCS-4 representation of any character is equal to the UCS-2 representation in the lower two bytes and 0x0000 in the upper two bytes.

The notation "0x" implies that the adjacent digits to the right of the 0x are hexadecimal digits. Thus, 0x10 is 16 in decimal, which is the same as 00010000 in binary.

Because most individuals communicate with the recipient of a message using the same one or two character sets as the sender, and because most character sets use no more than 7 or 8 bits, the UCS-2 and UCS-4 character sets are inefficient, because transmission times and storage space are larger than necessary to represent the few character sets used. For example, the ASCII character set uses 8 bits with the Most Significant Bit (MSB) equal to 0. When UCS-2 is used, every character requires 16 bits, doubling the length of information transmitted and stored.

More efficient transformations of the UCS-2 character set have been employed that provide the benefits of a character superset using fewer bytes per character than UCS-2, by adding special characters known as "shift" or "shift lock" characters that indicate how a subsequent character or subsequent characters should be interpreted.

Shift and shift lock characters are used to change the interpretation of one or more characters which follow it. The "shift" character changes the interpretation of the character immediately following it, similar to the shift key on a typewriter. A "shift lock" character changes the interpretation of the characters between the shift lock character and a "shift unlock".

Two character transformations are known as UTF-8 and UTF-7. UTF-8 uses 8-bit characters and encodes ASCII characters identically with their ASCII encoding. UCS-2 characters outside the ASCII character set and below 0x7FF use a two byte encoding per character, and those higher than 0x7FF use three bytes per character. UCS-4 characters require additional bytes. Thus two non-ASCII-encoded bytes of UCS-2 characters will result in a character of four or six bytes under UTF-8. The high order bits of each encoded byte of each character are similar to shift characters, indicating any transformation required to convert the current character back to its UCS-2 form.

UTF-7 also encodes ASCII characters using their ASCII encodings. UCS-2 characters outside the ASCII character set are transformed using a shift lock character. A shift lock character sequence has a special character at the beginning, a special character at the end, and a transformation rule for all characters in between the special character at the beginning and the special character at the end. To encode in UTF-7, the special character at the beginning is an ASCII '+' and the special character at the end is an ASCII '−' or any character that is not in the ASCII set 'A' through 'Z', 'a' through 'z', '0' through '9' '+', '/' and '='. Characters in between the special characters are encoded using "base 64 encoding".

"Base 64 encoding" is a process that converts a string of one or more bytes into a string of a limited set of ASCII characters. The bits in the unencoded string are encoded by first grouping them into sets of 6, starting with the most significant bit, and encoding each set of 6 bits into a byte. The encoding process uses Table 1 attached hereto, encoding each six bit set into the value of an ASCII character in a limited ASCII character set. The limited character set is used to ensure that other ASCII characters, which can cause uncertain results in some mail applications, are not used. If the string of unencoded characters does not have a number of bits that is evenly divisible by 6, i.e. with no remainder, the unused bits in the last set of 6 may be zero filled.

For example, a two byte UCS-2 character, Cyrillic 'B' or 0x0421, is not an ASCII character and therefore is encoded by UTF-7 using an shift lock character of '+', and a shift unlock character of '−' and the bit stream of 00000100 00100001 base 64 encoded by grouping the sixteen bits into three groups of six bits per group, 000001 000010 000100 with the trailing zeroes added. Using Table 1, the groups translate into 'B' 'C' 'E' which are encoded in ASCII as 0x42 0x43 0x45, and with the addition of the shift lock and unlock characters, would read 0x2B 0x42 0x43 0x45 0x2D.

Thus two bytes that are not ASCII encoded will result in 5 bytes under UTF-7. UTF-7 has an exception for encoding the ASCII '+' for situations when it is not being used as a shift lock character. The ASCII '+' is encoded in UTF-7 as the shift lock and unlock characters with no characters in between, '+−'.

"Base 64 decoding" operates in reverse of base 64 encoding. Each byte in a character is decoded using Table 1 to create a 6 bit result, and the results from a single character are concatenated to create the decoded character, removing any zero filled least significant bits, identified by the size of the resulting concatenated bits. For example, UCS-2 characters have 16 bits, and base 64 encoded UCS-2 characters use 3 bytes to produce 3 sets of 6 bits or 18 bits.

UTF-7 is a "mail safe" encoding. A "mail safe" encoding is one which never uses the MSB of each byte, because some electronic mail applications use the MSB for other purposes. In addition, a mail safe encoding restricts the use of some ASCII codes which have special meaning to certain e-mail systems.

An encoding is more "efficient" than another encoding when it represents characters using a smaller number of bits than the other encoding. Because characters in a message may be transmitted and/or stored, it is desirable to encode characters in such a manner that minimize the number of bytes required to represent most messages. Therefore, a method and system are needed to create a transformation of USC-2 and/or UCS-4 that is mail safe, more efficient than UTF-7 and at least as efficient as UTF-8.

SUMMARY OF INVENTION

In accordance with the present invention, a system and method encodes most ASCII characters using their ASCII encodings, and other characters using one of several encoding functions, depending on the binary value of the character. Characters having a binary value in one of several ranges of values are encoded similarly. To one or more characters encoded other than as an ASCII encoding is added either a shift character, for a single character in a given range, or a shift lock character, to identify multiple sequential characters in the same range. ASCII encoded characters are encoded without a shift or shift lock character. The resulting encoding is mail safe and not only more efficient than UTF-7 but also not less efficient than UTF-8 and can be more efficient than UTF-8 as well.

When encoded characters are received, the presence and value of any shift character preceding an encoded character or any shift lock character preceding one or more encoded characters is used to determine the decoding function which will properly decode the encoded characters.

DETAILED DESCRIPTION OF A PREFERRED EMBODIMENT

In one embodiment, the present invention is implemented as computer software running on one or more conventional computer systems.

Figure 1:
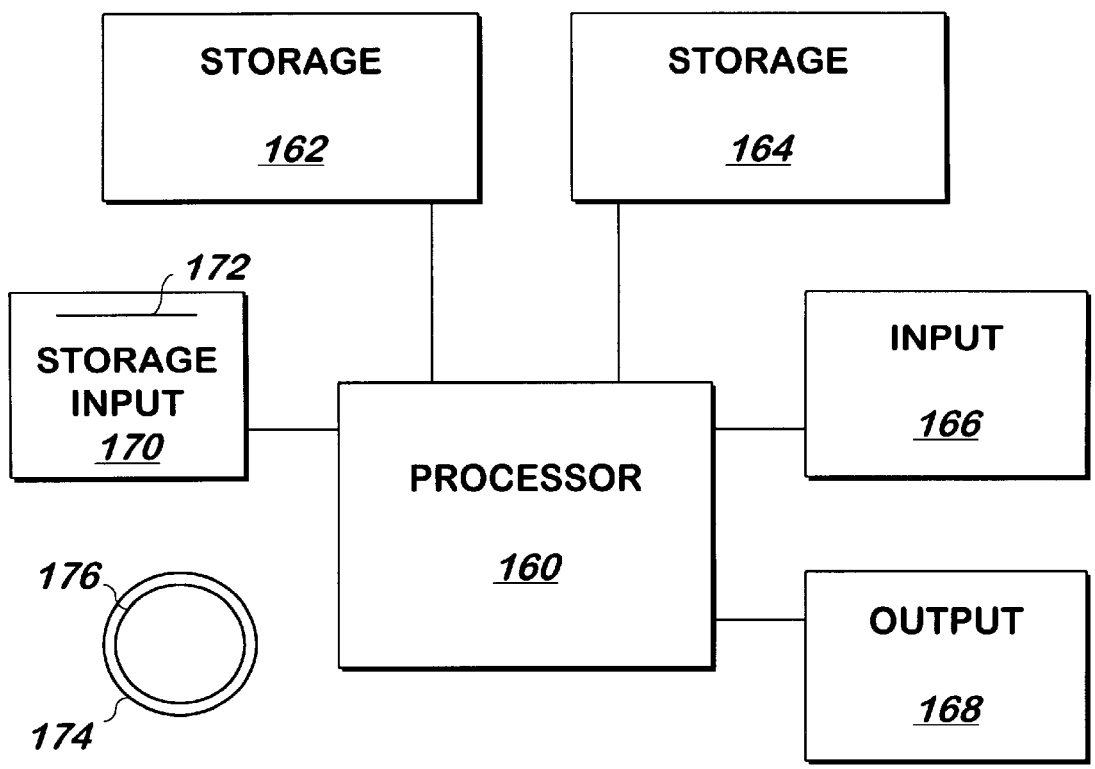
FIG. 1 is a block schematic diagram representing a conventional computer system.

Referring now to FIG. 1, a conventional computer system 150 for practicing the present invention is shown. Processor 160 retrieves and executes software instructions stored in storage 162 such as memory which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program product 174 such as a conventional floppy disk or CD-ROM that may be used to transport computer instructions or data to the system 150. Computer program product 174 has encoded thereon computer readable program code devices 176, such as magnetic charges in the case of a floppy disk or optical encodings in the case of a CD-ROM which are encoded to configure the computer system 150 to operate as described below.

Figure 2:
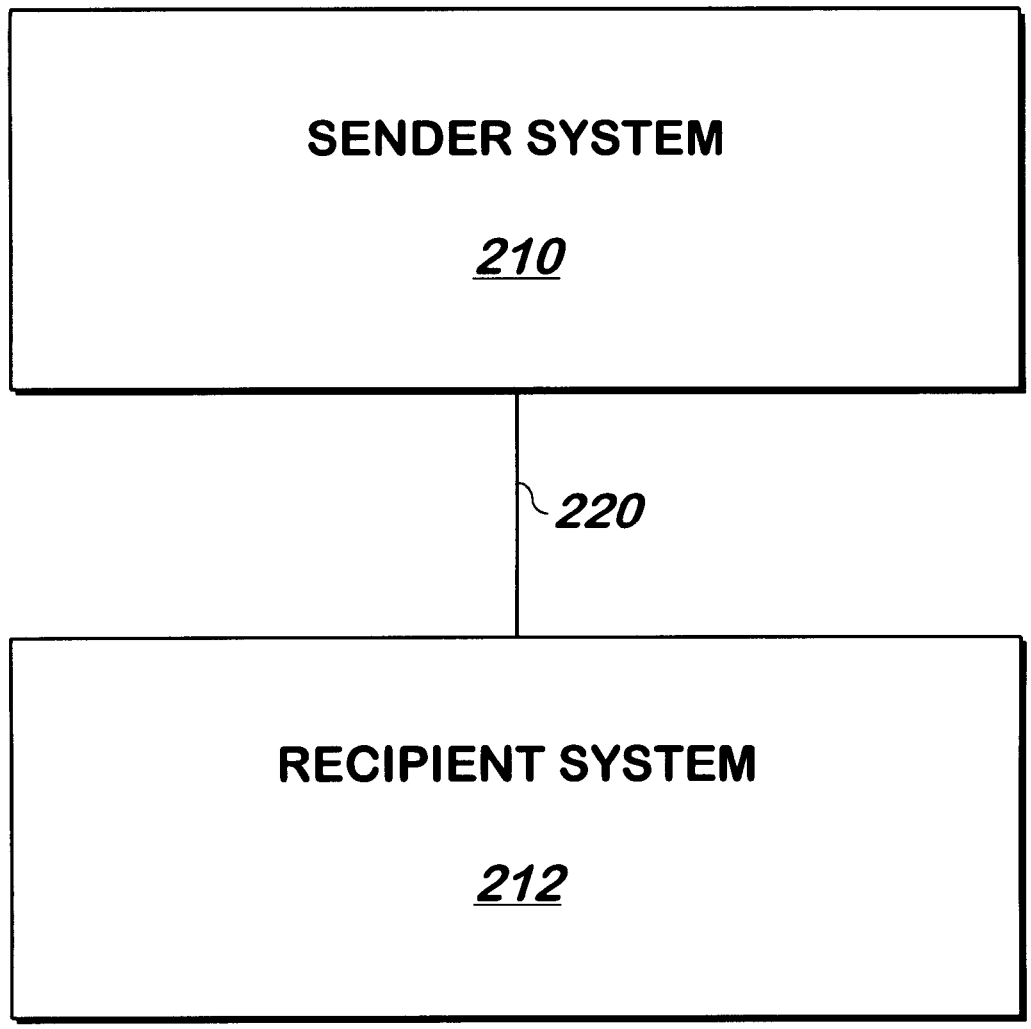
FIG. 2 is a block schematic diagram representing a sender system and a recipient system coupled by a communications link according to one embodiment of the present invention.

In one embodiment, two computer systems 150 may be used to implement the present invention. Referring now to FIG. 2, two computer systems 210, 212 coupled with a communications link 220, such as a wire, modem connection, network connection or the Internet, according to one embodiment of the present invention are shown. Although each computer system 210, 212 is shown performing as either the sender system 210 or the recipient system 212, a single computer system may contain both the sender system 210 and the recipient system 212 in one embodiment.

Both systems 210, 212 must agree either UCS-2 or UCS-4 characters are to be used. Each system 210, 212 may be hardwired to always use either UCS-2 or UCS-4, or may be configured to use UCS-2 or UCS-4. In one embodiment, a special character is sent by the sender system 210 designating either UCS-2 or UCS-4, and the recipient system 212 treats characters as designated. In another embodiment, the sender system 210 always transmits characters as UCS-2 and the recipient system 212 can convert them if desired.

The sender system 210 encodes UCS-2 or UCS-4 characters by identifying a range corresponding to the value of the character, encoding the character depending on the value of the character and optionally inserting either a shift character or a shift lock character, the encoded character or characters and, if necessary, a shift unlock character. ASCII characters may be encoded without a shift or shift lock character, and use the ASCII encoding for the character. The characters are transmitted to one or more recipient systems 212 via the communications link 220. The recipient system 212 decodes each character received using any applicable shift or shift unlock character.

I. Sender System

Character Storage

Figure 3:
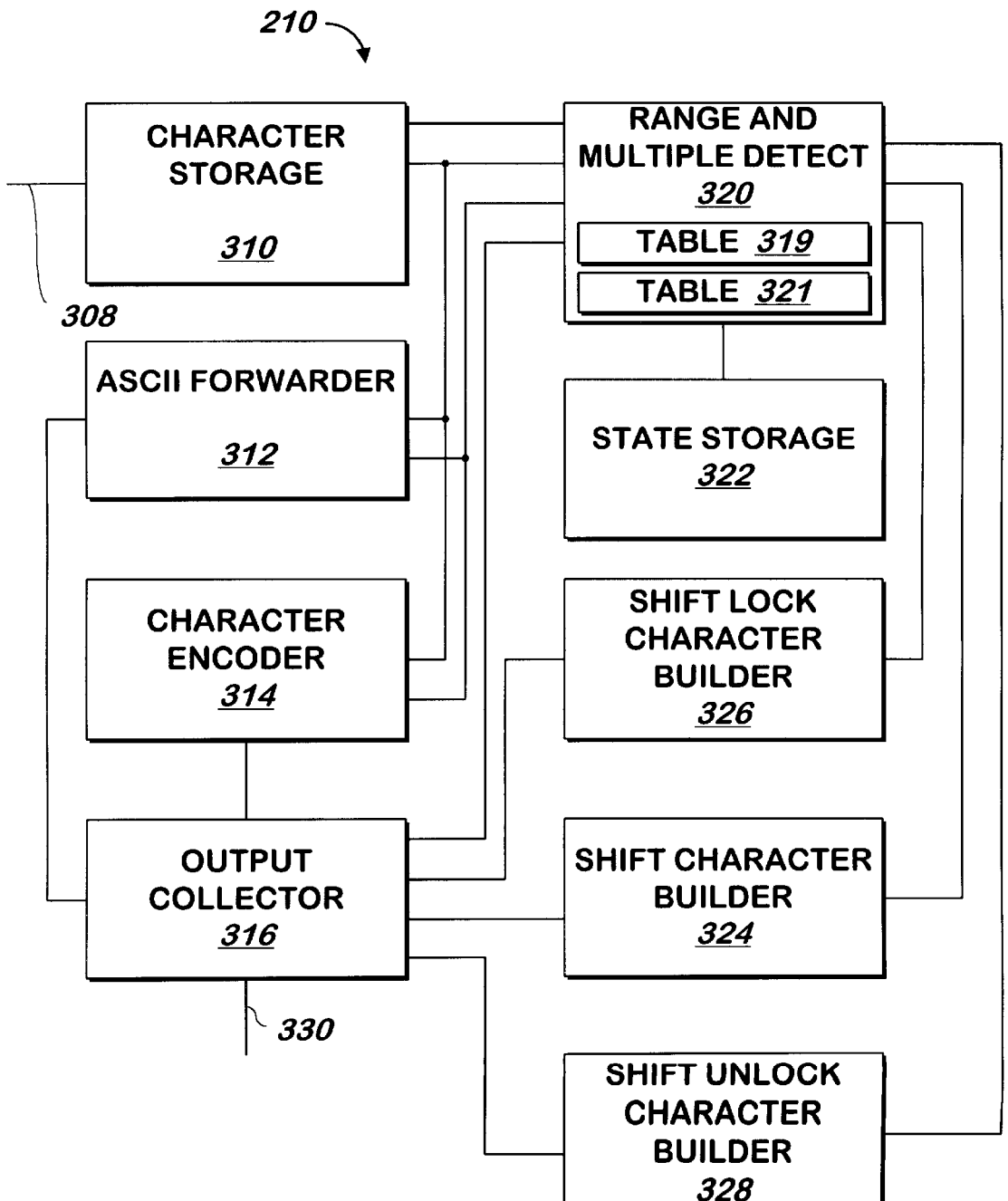
FIG. 3 is a block schematic diagram representing the sender system of FIG. 2 according to one embodiment of the present invention.

Referring now to FIG. 3, one embodiment of a sender system 210 of FIG. 2 is shown. Character storage 310 accepts one or more characters at input 308 and stores one or more characters received in a queue. The character at the head of the queue is referred to herein as the "current character."

As the current character in character storage 310 is processed as described below, the character at the head of the queue is logically or physically removed from the queue and the next character in the queue becomes the head, or current character.

Range and Multiple Detection

Range and multiple detect 320 operates in conjunction with character storage 310 to detect the range of a current character and identify whether to use a shift or a shift lock character depending on whether one or more characters following the current character are or may likely be multiple sequential characters in the same range as the current character. Range and multiple detect 320 identifies the range of the one or more characters stored at or near the head of the queue in character storage 310. In one embodiment, range and multiple detect 320 identifies the range of a character according to Table 2A attached hereto, although other ranges may be used.

In one embodiment, the current character and an additional character, the next character sequentially received by character storage 310, are provided by character storage 310 to range and multiple detect 320, which detects the range of the character at the head of the queue and the range of the next additional character stored in the queue in character storage 310.

Prohibited Set

In one embodiment, some bytes values are prohibited. The value of bytes that are prohibited are never used in any byte of an encoded character. The value of bytes that are prohibited are said to be in a "prohibited set" which contains all eight bit values that are not in the set of ASCII encodings for 'A' through 'Z', 'a' through 'z', '0'–'9' and '''' (ASCII 39), '(', ')', '"' (ASCII 44), '–', '.', '/', ':', and '?' in one embodiment. In another embodiment, the prohibited set is all eight bit values that are not in the set of ASCII encodings for 'A' through 'Z', 'a' through 'z', '0'–'9' and '''' (ASCII 39), '(', ')', '"' (ASCII 44), '–', '.', '/', ':', '?', '!', '"', '#', '$', '%', '&', '*', ',', ';', '<', '=', '>', '', '[', ']', '^', '_', '`' (ASCII 96), '{', '|', and '}'. Other prohibited sets may be designated in other embodiments. For example, the ASCII characters in the prohibited set have special meaning to mail systems and the present invention and should therefore not be used in message text output. In such embodiment, if a byte would be encoded using one encoding function that would produce such a value, that encoding function must not be used, and instead the entire current character must be treated as if it is in range 3 or 6 of Table 2A, described below, so that the character can be encoded without using a byte value in the prohibited set. In such embodiment, all values not in the prohibited set are stored in a look up table 321 contained in range and multiple detect 320. Range and multiple detect 320 identifies the range of any current character in range 1 or 2 by first comparing the least 7 bits of its value with those stored in the lookup table 321, and if the value is found in the lookup table 321, range and multiple detect 320 compares the value of the current character with each range, starting with range 1, and stopping when the lowest range is identified that contains the current character. Values that would otherwise be in range 1 or 2 that do not have lower 7 bit values in the lookup table 321 are in the prohibited set, and are identified as in range 3 by Range and multiple detect 320.

Generation of Shift, Shift Lock and Shift Unlock Characters

In one embodiment, using the values in Table 2A, range and multiple detect 320 directs shift character builder 324 or shift lock character builder 326 to build the character specified in Table 2A. In one embodiment, range and multiple detect 320 sends the range number generated as described above to either shift lock character builder 326 if a multiple is detected or predicted as described above and no shift lock for that range currently applies, or to shift character builder 324 if no multiple is detected as described above if the shift lock for that range applies. If shift lock character builder 326 receives a 3, it generates an ASCII code for '*', decimal 42, and if it receives a 6, it generates an ASCII code for '+', decimal 43. If shift character builder 324 receives a 2, it generates an ASCII '%', decimal 37, if it receives a 3 or 4, it generates an ASCII &, decimal 38, if it receives a 5, it generates a '#' decimal 35.

Range and multiple detect 320 stores the state and range of any shift lock that is on in state storage 322 and if a shift lock is on and the character after the current character is not in the same range as the current character, or no additional characters are in the character storage 310, range and multiple detect 320 instructs shift unlock builder 328 to provide to output collector 316 a shift unlock character. In one embodiment, the shift unlock character is the ASCII encoded '–' to unlock all ranges of shift locks, and in another embodiment, different characters are used based on the range of the shift lock that was on as indicated by state storage 322. In another embodiment, the shift unlock character is encoded as ASCII '–' or it is implied upon the receipt of any encoded byte value not in Table 1 if the shift lock is active or on.

Shift character builder 324, shift lock character builder 326 or shift unlock character builder 328 build the character as described in Table 2A or an ASCII '–' as described above, and forward the shift, shift lock or shift unlock character built to output collector 316, described below, for forwarding to the recipient system, 212 of FIG. 2, described below. In some cases, a shift or shift lock character will follow a shift unlock character, and in such case, both characters are sent to output collector 316 which forwards the characters.

ASCII Forwarding

Range and multiple detect directs the operation of ASCII forwarder 312. If range and multiple detect 320 identifies the current character as an ASCII character not in the prohibited set described above, it signals ASCII forwarder 312. ASCII forwarder 312 receives the current character from character storage 310 and forwards the least significant byte of the current character to output storage 316.

Character Encoding

Range and multiple detect directs the operation of character encoder 314. If range and multiple detect 320 identifies the current character as in ranges 2–6 in one embodiment, or 1–6 in another embodiment, it sends the range to character encoder 314. Character encoder 314 retrieves the current character from character storage 310, encodes the current character according to Table 2A and forwards the resulting character or characters to output collector 316.

Note that characters such as '#' that would be interpreted as a shift or shift lock character are preceded with the shift character of '&' to identify that the character is being used as other than a shift or shift lock character. Thus, the character '#' is encoded for transmission as a character using the ASCII codes for the two characters, '&#'.

Figures 4, 5:
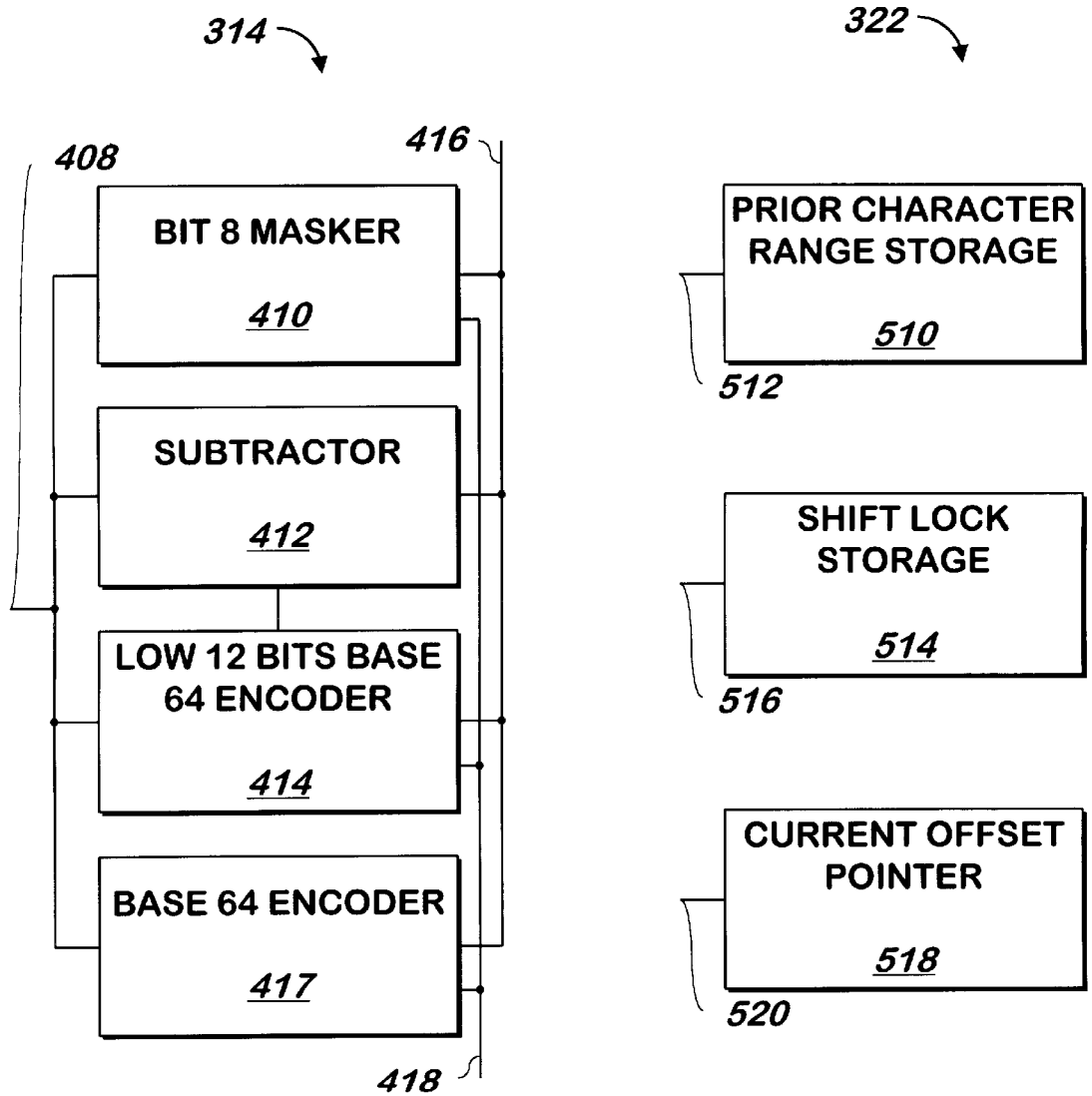
FIG. 4 is a block schematic diagram representing a character decoder of FIG. 3 according to one embodiment of the present invention.
FIG. 5 is a block schematic diagram representing a state storage of FIG. 3 according to one embodiment of the present invention.

Referring now to FIG. 4 and Table 2A, a character encoder 314 of FIG. 3 is shown according to one embodiment of the present invention. The UCS-2 or UCS 4 current character is received at input 408 and the range of that character is received at input 416. If the range at input 416 is 2, the most significant bit of the low order byte of the character received at input 408 is masked to 0 by bit 8 masker 410, for example using an and function, and the resulting byte is output by bit 8 masker 410 at output 418.

In one embodiment, bit 8 masker is also used to pass through ASCII characters in ranges 1 and 4. Masking bit 8 of an ASCII character results in the same character because all ASCII characters have an MSB of 0. In such embodiment, bit 8 masker 410 performs the masking function described above and provides the resulting low order byte to output 418 if input 416 is 1 or 4. In such embodiment, ASCII forwarder 312 of FIG. 3 is not used.

If input 416 is 3, low bits base 64 encoder 414 converts the 12 least significant bits of the UCS-2 or UCS-4 character received at input 408 to two base 64 encoded characters using "low 12 bits base 64 encoding", defined below.

"Low 12 bits base 64 encoding" encodes a character having 12 bits by grouping the least significant 12 bits into two sets of 6 bits each, discarding the remaining high order bits. Each set of 6 bits is encoded as one base 64 character using Table 1, and the result concatenated to produce a two byte character. For example, a two byte character 0x0187 having 16 bits of 0000000110000111 is grouped into two groups of the lower 12 bits 000110 and 000111, base 64 encoded as 01000111 and 01001000 from Table 1, produces a two byte encoded character 0x4748.

Low 12 bits base 64 encoder 414 outputs the character so encoded to output 418. Each encoded character output by low 12 bits base 64 encoder contains two bytes.

If input 416 is 5, subtractor 412 subtracts the hexadecimal value 1E00 from the UCS-2 or UCS-4 character at input 408 and passes the result to low 12 bits base 64 encoder 414, which encodes the result it receives from subtractor 412 into two low 12 bits base 64 characters as described above, and provides the two byte resulting character to output 418.

If input 416 is 6, base 64 encoder 417 encodes all bits of the UCS-2 or UCS-4 character it receives at input 408 into a multiple byte character stream by base 64 encoding the UCS-2 or UCS-4 character received at input 408 to produce a set of 64 bit encoded characters. Base 64 encoder 417 provides the resulting base 64 encoded characters to output 418.

Alternate Embodiments of Multiple Character Detection, State Storage

Referring again to FIG. 3, in an alternate embodiment of the present invention, instead of looking ahead to an additional character stored in a queue in character storage 310, character storage 310 provides to range and multiple detect 320 the current character and range and multiple detect 320 predicts the range of the character following the current character. In one embodiment, the prediction is made based on the range of the character that preceded the current character.

Range and multiple detect 320 stores in state storage 322 an indicator of the range of the prior character and whether a shift lock applied to the prior character. If range and multiple detect 320 identifies the current character as a character in a different range than the range of the character that preceded the current character, such range being stored in state storage 322, range and multiple detect 320 will cause the system to generate any necessary shift to indicate the range of the current character, and if a shift lock was stored in state storage 322, range and multiple detect 320 instructs shift unlock character builder 328 to provide the shift unlock character as described above and changes the range of the shift lock in state storage to "off". Range and multiple detect 320 stores an indicator of the range of the current character in state storage 320 and sets the shift lock indicator to "off".

If range and multiple detect 320 identifies the current character as having a range the same as the range of the character preceding the current character as stored in state storage 322 and the shift lock indicator in state storage 322 is off, range and multiple detect 320 changes the state of the shift lock indicator in state storage 322 to "on", directs shift lock character builder 326 to build and provide to output collector 316 the shift lock character corresponding to the range of the current character and the character preceding it, the shift lock character being generated as described above, and directs character encoder 314 to encode the character as described above. If the state of the shift lock stored in state storage 322 indicates the shift lock is "on" and the range of the prior character is the same as the current character, no shift, shift lock or shift unlock characters are built, and the character is encoded as described above. This embodiment causes the first character of a string of characters in the same range to be shifted, delays the shift lock until the second character in a string, and will both shift and shift lock a two-character same-range string, but can allow the character savings of a shift lock to be used even if the character after the current character is not available for use in detecting multiple sequential characters in the same range or its use is not desirable.

In one embodiment, a shift or shift lock clears any prior shift lock. In another embodiment, shift and shift locks interrupt any current shift lock, and following the shift or the shift lock that interrupted a prior shift lock, the prior shift lock is on. Prior character range storage 510 and shift lock storage 514 each contain several addressable storage locations in a storage such as memory or disk and state storage 322 contains multiple memory locations and a "current offset pointer" 518 to allow the interrupt-like shift and shift lock to be implemented using a stack. The current offset pointer is initialized to zero and is added to the beginning address of the storage address or addresses of prior character range storage 510 and shift lock storage 514 to locate the current value stored in each storage 510, 514. Any shift or shift lock state is pushed onto the stack in prior character range storage 510 and shift lock storage 514, preserving the former values. Shift unlocks and shifts from a prior character pop the stack in prior character range storage 510 and shift lock storage 514.

Shift, Lock and Unlock Character Selection, Range Value Selection

The shift, shift lock and shift unlock characters described herein need not be the characters set forth herein, as any other characters will work as long as the sender and recipient systems both use the same characters. Range 4 provides a mechanism to use these characters as other than shift, lock and unlock characters, so even characters that are often used as other than shift, lock and unlock characters may be used, although using rarely used characters as shift, lock and unlock characters such as the characters of Tables 2A, 2B attached hereto and 2C attached hereto can help reduce the number of shift characters required to specify the character as a non-shift or non-shift lock character using range 4.

The current character values of each range specified in Tables 2A, 2B, and 2C may be replaced by other values as long as the sender and recipient systems use the same conversion rules. The current character values of each range specified in Tables 2A, 2B, and 2C were selected so that characters most likely used together were in the same range, reducing the number of shift and shift lock characters required to send many messages. Shift lock characters were specified only for ranges most likely to have a sequential series of characters in the same range. Shift characters were specified for ranges most likely to have a single non-range 1 character in the midst of a range 1 sequence. Additional shift lock characters could have been specified for other ranges, requiring the use of the shift character of range 4 to specify the use of the character as other than a shift lock character.

Output Collector

In one embodiment, output collector is a bus, collecting the inputs from shift lock character builder 326, shift character builder 324, shift unlock character builder 328, character encoder 314 and ASCII forwarder 312 and providing them at output 330 as they are received. In another embodiment, output collector 316 queues these characters and provides them to output 330 in the proper order upon a signal from range and multiple detect 320, which it provides when each character is encoded or each shift, shift lock or shift unlock character is generated. In another embodiment, no signal from range and multiple detect 320 is received by output collector 316 to signal when stored output characters are ready for transmission. Instead, ASCII forwarder 312 and character encoder 314 signal output collector to transmit the characters it stores by sending to output collector 316 a non-ASCII value end of transmission character which is not provided to output 330 by output collector 316.

EXAMPLE

A message will be encoded for purpose of example. The message contains four UCS-2 characters, ASCII 'A', 0xFFE, 0xFFF and 0x1E00. The characters arrive via input 308, and are stored in, character storage 310. The first character, ASCII 'A' is output by character storage 310 as the current character and the second character 0x FFE is output by character storage 310 as the next character. Range and multiple detect 320 identifies the range of the current character as range 1 after testing the current character against the values of prohibited characters in lookup table 321, and identifies the range of the next character as range 3. Because the two ranges are not the same, range and multiple detect 320 identifies the first character as not a multiple character of the same range. Range and multiple detect 320 outputs the range of 1, and activates shift character builder 324 which does not build any character, because no shift character is used for range 1 characters. ASCII forwarder 312 receives the range number 1 from range and multiple detect 320, and the current character from character storage 310 and sends the least significant byte of the first character to output collector 316 which forwards the byte to output 330. ASCII forwarder 312 or range and multiple detect 320 signals character storage 310 to discard the current character and to provide the next character received as the current character. Range and multiple detect 320 sets the state of the range variable to 1, and the state of the shift lock to off in state storage 322.

Range and multiple detect 320 detects the range of the current character as range 3, the range of the next character output by character storage 310 as 3, and identifies that a multiple character has been detected. Range and multiple detect checks the state of the shift lock stored in state storage 322 and detects that no shift lock applies that would otherwise have to be unlocked. Range and multiple detect 320 signals shift lock character builder 326 using the range value of 3, and shift lock character builder 326 builds the ASCII character '&' and transmits it to output collector 316 for forwarding to output 330. Range and multiple detect 320 outputs the range to character encoder, which encodes the character using low 12 bits base 64 encoding and outputs the encoded character to output collector 316 for forwarding to output 330. Range and multiple detect 320 or character encoder 314 signals character storage 310 to advance the next character to be the current character. The range of 3 and shift lock "on" states are stored in state storage 322 by range and multiple detect 320.

The third character is received by range and multiple detect 320 which identifies that the current character is in the same range as the applicable shift lock stored in state storage 322 and signals character encoder 314 with '3', the range of the current character, and character encoder 314 encodes the third character using low 12 bits base 64 encoding, and transmits the encoded character to output collector 316 for forwarding to output 330. Range and multiple detect 320 or character encoder 314 signal character storage 310 to advance the fourth character as the current character.

Character storage 310 outputs the fourth character as the current character, and range and multiple detect 320 identifies that the range of the current character is different from the range of the applicable shift lock.

Range and multiple detect 320 instructs shift unlock character builder 328 to generate an unlock character and shift unlock character builder provides an ASCII '–' to output collector 316 for forwarding to output 330.

In one embodiment, if the character, available from character storage 310, that follows the current character will be encoded into a set of one or more bytes where the first byte transmitted is not in the set of encoded characters in Table 1, range and multiple detect 320 does not cause the generation of a shift unlock character. Instead, the shift unlock is implied by the byte not in Table 1, as described below. Range and multiple detect stores in lookup table 319 a set of characters that will be encoded into a set of one or more bytes where the first byte transmitted is not in the set of characters in Table 1, and compares the character that follows the current character with the characters in the lookup table 319. If a match is discovered, no shift unlock character is generated as described above, and otherwise a shift unlock character is generated as described above.

Using the character, available from character storage 310, that follows the current character, range and multiple detect identifies that the current character is not a multiple character, and signals shift character builder 324 with the range number 5. Shift character builder 324 builds a shift character '#' and sends it to output collector 316 for forwarding to output 330. The range of 5 is transmitted to character encoder 314 which encodes the current character stored in character storage 310 by subtracting 0x1E00 and low 12 bits base 64 encoding it. The range of 5 and shift lock state "off" are stored in state storage 322 by range and multiple detect 320.

Method of Encoding

Figure 6:
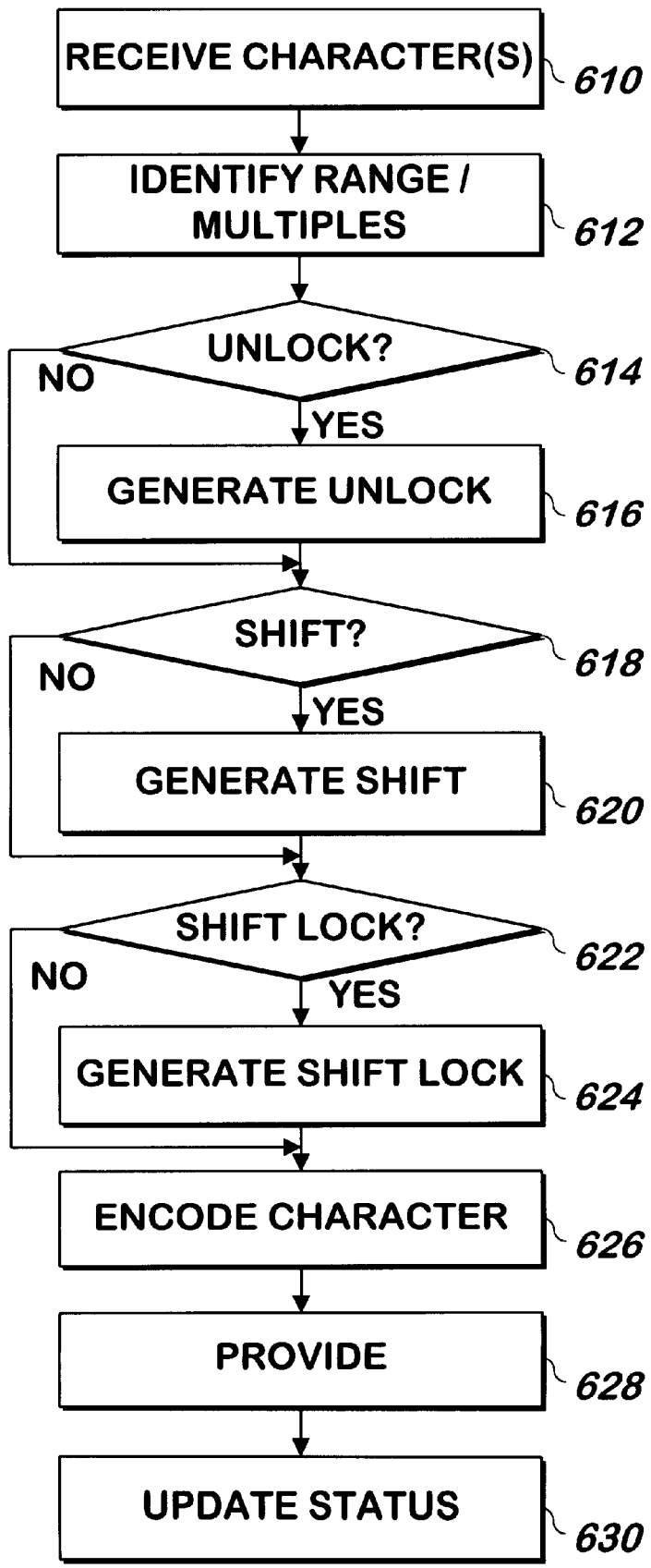
FIG. 6 is a flowchart illustrating a method of encoding characters and generating shift, shift lock and shift unlock characters according to one embodiment of the present invention.

Referring now to FIG. 6 a method of encoding characters is shown according to one embodiment of the present invention. A current character and optionally, one or more subsequent characters are received 610. The range of the current character is determined using Table 2A in one embodiment, and the existence of an adjacent character in the same range is also identified as a multiple character or "multiple" 612. In one embodiment, the adjacent character is the character received prior to the current character, and in another embodiment, the adjacent character is the character received after the current character.

If the range is different from the prior character and a shift lock was used to encode the prior character, in one embodiment the shift lock requires unlocking 614 and the shift lock is unlocked 616. In another embodiment, the shift lock is interrupted using the stack procedure described above.

If the current character is not a multiple character, and the range of the current character requires a shift 618 because the current character has a range different from an applicable shift lock or no shift lock is active and the current character is not in range 1, any shift character corresponding to the range of the current character from Table 2A is generated 620. If the character is a multiple character and a shift lock for the range of the current character does not apply, a shift lock is used 622 and one is therefore generated 624 based on the range of the current character as set forth in Table 2A. The encoded character is generated as described above and below 626 and any shift unlock, shift, shift lock and encoded characters generated as described above are provided. Status information such as the range of the current character and the state of the shift lock is updated for use encoding any subsequent character 630.

The initial two bytes of 0x0000 may be stripped from UCS-4 characters to convert them for encoding as UCS-2 characters in any step prior to step 628, or the encoded character may be similarly converted in step 628 before providing the encoded character. In another embodiment, characters in range 6 are encoded as four byte characters to accommodate the possibility of the first two bytes having a value different from 0x0000.

Figure 7:
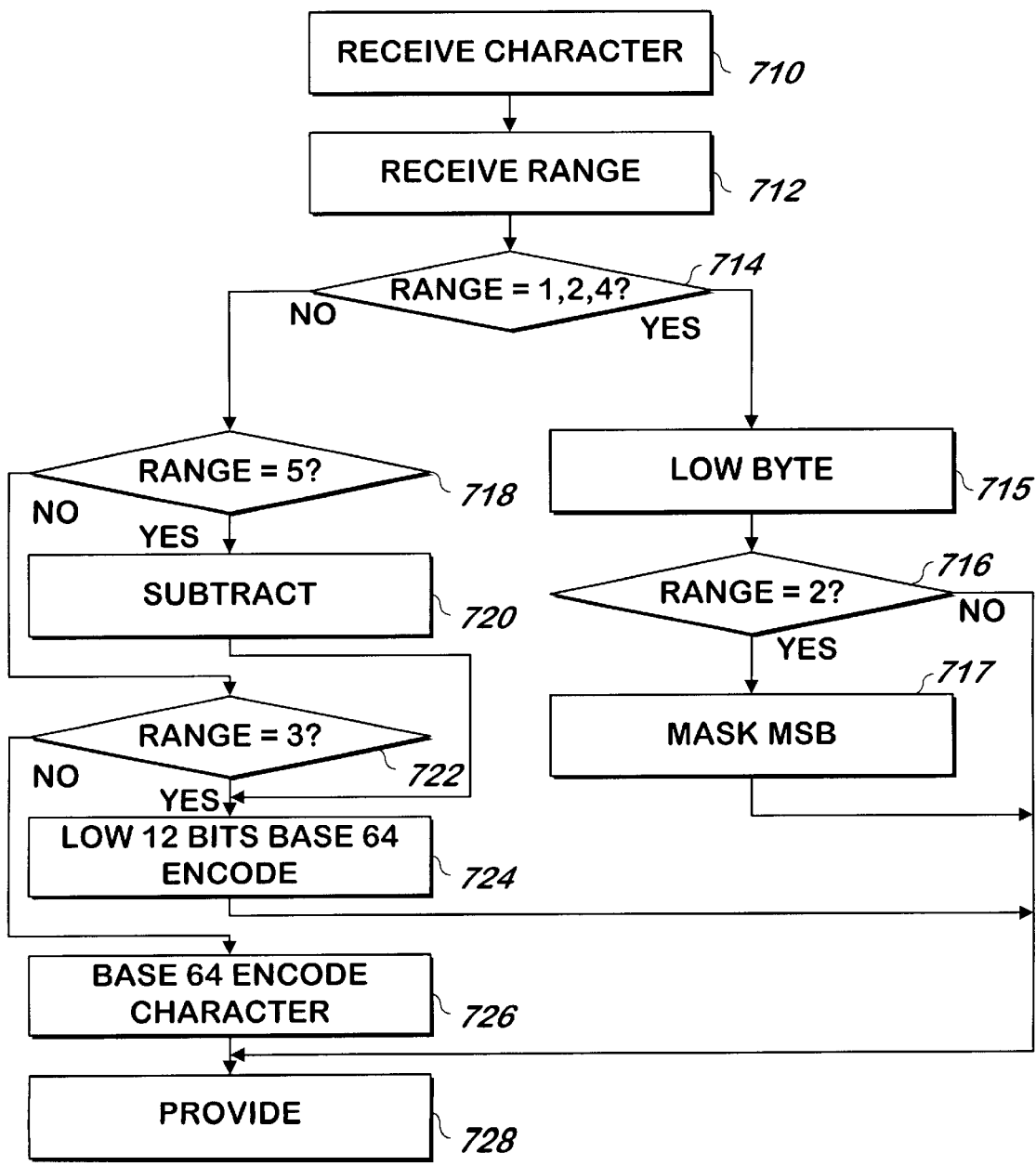
FIG. 7 is a flowchart illustrating a method of encoding a character according to one embodiment of the present invention.

Referring now to FIG. 7, a method of encoding a character to produce an encoded character described at step 626 of FIG. 6 according to one embodiment of the present invention is shown.

The character and an indicator corresponding to the range of the character is received 710, 712. The range may be computed using Table 2A or other ranges may be used. The range is used as described below to determine how to encode the character. If the range is 1, 2 or 4, the character is encoded 715 as a one byte character equal to the least significant byte of the character received at step 710. The most significant bit of the encoded character is masked to zero if the range is 2 716, 717. In one embodiment, the test for the range of 2 in step 716 is not performed, and the most significant bit of all characters in ranges 1, 2 or 4 are cleared to 0. Because characters in ranges 1 and 4 will already have an MSB=0, the masking step 717 will have no effect on such characters.

If the range is 5, 718 a value of 0x1E00 is subtracted 720 from the character received at step 710 and the result passed to step 724 via step 722 in one embodiment, or directly in another embodiment shown in the figure. Other values may instead be used to subtract from the character received as described below.

If the range is 3 722, the character received at step 710 is encoded by low 12 bits base 64 encoding the least significant 12 bits of the current character into two low 12 bits base 64 encoded bytes 724. If the range is 5, the low 12 bits base 64 encoding of the least significant 12 bits is performed on the result of the subtraction performed in step 720. If the character received at step 710 is not in the ranges 1–5, the character received at step 710 is encoded using conventional base 64 encoding techniques described above 726. The character may be encoded into a UCS-2 character in one embodiment, or a UCS-4 character in another embodiment, in step 726.

The encoded character is provided 728 for subsequent transmission as described above.

Alternative Embodiments

Alternative embodiments of the apparati and methods of the present invention are possible. Referring now to FIGS. 3, 4, 6 and 7 and Tables 2A, 2B and 2C, in one embodiment, the values of current characters in range 5 may be adjusted, for example from 0x1B00 to 0x2AFF in one embodiment, with a value of 0x1B00 subtracted to encode such current characters. Such embodiment is specified in Table 2B. In another embodiment, range 5 spans current characters from 0x1000 to 0x2FFF with one shift character for current characters from 0x1000 to 0x1FFF (specified in Table 2C as range 5A) and a different shift character for current characters from 0x2000 to 0x2FFF (specified in Table 2C as range 5B, where ranges 5A and 5B make up range 5).

In other embodiments, the encoding and shift characters specified for one range may be used for current characters in a different range. For example, current characters in range 2 can be encoded using the encoding and shift character of range 3, adding one byte per character to the result, and combining step 722 with step 714.

Still other embodiments are possible. The encoding and shift lock character of range 3 can be used to encode single characters in range 3. Single characters in range 3 can be encoded using the encoding and shift lock/unlock characters of range 6. Range 4 characters can encoded and shift/shift lock/unlock characters generated from ranges 3 or 6. Range 5 characters can be encoded using the encoding and shift lock/unlock characters of range 6.

If multiple characters in range 3 include a single character in range 1 or 2, the single character may be encoded in range 3 to avoid having to generate a shift unlock character and the shift character for range 3.

Although some alternate embodiments described above can require more bytes in the resulting encoded character stream, they may simplify the apparati and methods of the present invention. Other alternate embodiments require more bytes to encode a single character but reduce the total number of bytes to encode all characters, such as the encoding of a range 1 or 2 character as a range 3 character to avoid a shift unlock and new shift lock which can otherwise be required.

II. Recipient System

Figure 8:
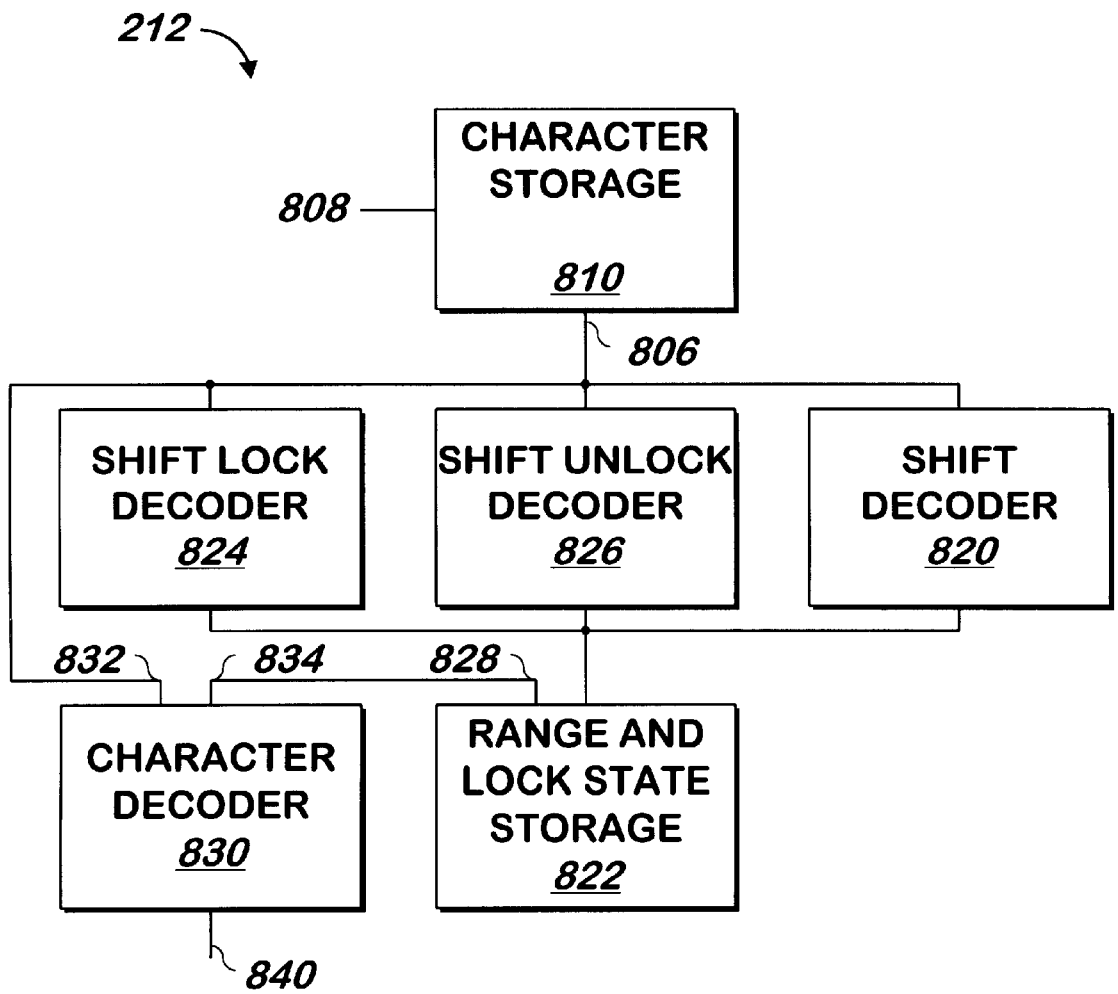
FIG. 8 is a block schematic diagram representing the recipient system of FIG. 2 according to one embodiment of the present invention.

Referring again to FIG. 2, characters encoded as described above using the sender system 210 may be transmitted by the sender system 210 via communication link 220 such as a wire, network, modem, the internet or other links to recipient system 212 for decoding. Referring now to FIG. 8, a recipient system 212 according to one embodiment of the present invention is shown. The recipient system receives the characters, identifies the range of the characters using the shift, lock and unlock characters and decodes the character by reversing the character encoding used to encode the characters. The character encoding in Table 2A is assumed below unless otherwise specified, although other encodings described above are also possible.

Character Storage

Character storage 810 receives and stores encoded characters via input 808. Because the encoding of the present invention encodes each character as a set of bytes of varying number of bytes per character, character storage provides at its output 806 one byte at a time in one embodiment. When the first byte is received, character storage 810 provides it to output 806, and the byte output by character storage 810 is referred to herein as the "current byte".

Shift, Lock and Unlock Decoder

Range and lock state storage 822 stores indicators of the range for any current byte and whether any shift lock applies. A range storage in range and lock state storage 822, which may be made from any storage device such as memory or disk, is initialized to a value of "1", to signify that any bytes received prior to a shift, lock or unlock character are to be interpreted as ASCII characters, and the shift lock storage which may be made from any storage device such as memory or disk is initialized to 0 or "off" to signify that no shift lock applies.

Shift decoder 820, shift lock decoder 824 and shift unlock decoder 826 decode the byte output at output 806 looking for shift, lock and unlock characters. If a shift, lock or unlock character is found, shift decoder 820, shift lock decoder 824 or shift unlock decoder 826 alter the status stored in range storage and shift lock storage in range and shift lock storage 822 by providing to range and shift lock storage 822 the range number, and shift lock state corresponding to the character received.

In one embodiment, after a shift unlock is decoded, shift unlock decoder 826 passes the state of the shift lock as 0 or "off" and a range of 1 to range and lock state storage 822 for storage. In one embodiment, shift unlock decoder 826 signals that a shift unlock is decoded if a character not in Table 1 is received as the current byte while range and lock state storage 822 identifies the shift lock as "on". Such "implied unlock" byte is actually a part of the next character, and the implication may be drawn because bytes applicable to a shift lock are either base 64 encoded or low 12 bits base 64 encoded, which use Table 1. Bytes received not encoded using one of the encoded character values of Table 1 are assumed to be in a different range from the preceding shift locked characters, and therefore any applicable shift lock may be unlocked.

In another embodiment, range storage in range and lock storage 822 acts as a stack described above. If a shift character is decoded by shift decoder 820, shift decoder 820 pushes the range number corresponding to the shift character decoded as set forth in Table 2A onto the stack that stores the range, allowing the shifted range to be used as the range for the following character. Shift decoder 820 pops the stack when the character corresponding to the current byte is decoded, in response to a signal from the device, described below, that decodes the character.

If a shift lock character is decoded, shift lock decoder 826 pushes onto the stack the range corresponding to the shift character decoded, and shift unlock decoder 826 pops the stack when it decodes a shift unlock character. In one embodiment, the shift unlock character is '–' for all ranges that use a shift lock character.

When shift, lock and unlock decoders 820, 824, 826 decode a shift, shift lock or shift unlock, shift, lock and unlock decoders 820, 824, 826 direct character storage 810 to send to output 806 the byte received following the shift, shift lock or shift unlock character as the current byte and the prior byte may be logically or physically discarded, unless the character decoded is an implied shift unlock.

Character Decoding

In one embodiment, character decoder 830 receives via input 832 one or more bytes from the output 806 of character storage 810 and the range of the current character stored in range and lock state storage 822 via input 834 and decodes the one or more bytes into a character according to the range received at input 834 as described below in one embodiment. Character decoder 830 decodes the character as either UCS-2 in one embodiment, or UCS-4 in another embodiment by appending 0x0000 to the most significant two bytes of the decoded character in all ranges in one embodiment, or in all ranges except range 6 in another embodiment where all four bytes of range 6 characters were encoded.

After character decoder 830 decodes a character in a range other than range 1, if the state of the shift lock in range and lock state storage 822 is off, character decoder 830 changes the state of the range to "1" because characters which follow such shifted characters are to be assumed in range 1 unless a shift or shift lock character is received in one embodiment.

Figure 9:
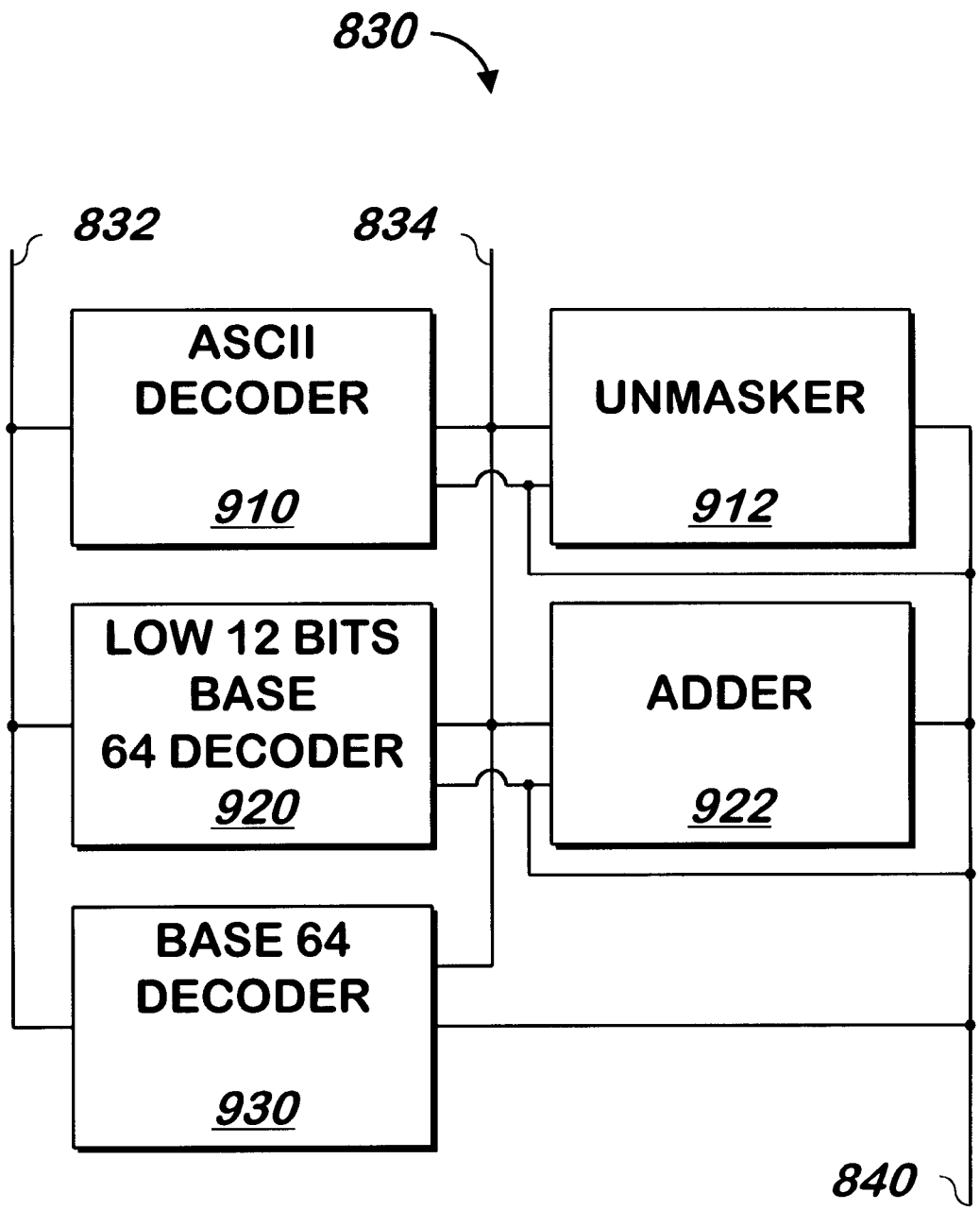
FIG. 9 is a block schematic diagram representing a character decoder of FIG. 8 according to one embodiment of the present invention.

Referring now to FIGS. 8 and 9, a character decoder 830 according to one embodiment of the present invention is shown. If the range stored in range and lock state storage 822 is 1, 2 or 4, the current byte at output 806 is received by ASCII encoder 910 and decoded into a UCS-2 character or UCS-4 character by adding the byte at output 806 as the least significant byte to 1 or 3 0x00 most significant byte or bytes. The ASCII decoder 910 sends the resulting UCS-2 or UCS-4 character to unmasker 912. If the range stored in range and lock storage 822 is 1 or 4, the character is passed through unmasker 912 to output 840 in one embodiment, or directly to output 840 in another embodiment. Upon completion of the decoding described above, ASCII decoder 910 signals to character storage 810 to logically or physically discard the current byte and select the next byte received for output to output 806 as the current byte. If the range stored in range and lock storage 822 is 2, unmasker 912 sets the MSB in the least significant byte in the character decoded by ASCII decoder 910 to 1 before passing the character to output 840.

If the range stored in range and lock state storage 822 is 3 or 5, low 12 bits base 64 decoder 920 receives the current byte at output 806 and requests character storage 810 to provide at output 806 the byte received after the current byte as the new current byte. Low 12 bits base 64 decoder 920 decodes the two bytes using "low 12 bits base 64 decoding". "Low 12 bits base 64 decoding" decodes into 6 bits each of the two bytes individually using base 64 decoding, which operates in reverse of base 64 encoding. The resulting 2 sets of decoded 6 bits are concatenated into the low order 12 bits of a two byte character, with the remaining 4 most significant bits filled with zeros. Low 12 bits base 64 decoder 920 additionally pads the high two bytes of any UCS-4 characters with 0x0000. Low 12 bits base 64 decoder 920 directs character storage 810 to provide the next byte received to output 806 as the current byte and directs shift, lock and unlock decoders 820, 824, 826 to decode the next byte.

The resulting two byte character is passed to adder 922 which passes the character to output 840 if the range stored in range and lock state storage 822 is 3, and adds the value which was subtracted in the encoding process to the character output by low 12 bits base 64 decoder 920 if the range stored in range and lock state storage 822 is 5. In one embodiment, the value added by adder 922 must be coordinated with the value subtracted in the encoding process, with the same number or numbers built into each apparatus. Adder 922 provides the result to output 840 after performing the add. The value added may be any value, such as those described above.

In one embodiment, adder is used in place of unmasker 912, with adder receiving the character produced by ASCII decoder 910, adding the value 0x80 to the low order byte, and providing the result to output 840 if the range stored in range and lock state storage 822 is 2.

If the range stored in range and shift lock state storage is 6, base 64 decoder 930 receives the current byte at output 806 and requests character storage 810 to output additional bytes, decoding characters as UCS-2 or UCS-4 characters by base 64 decoding. Base 64 decoding reverses the base 64 encoding process as bytes are received, assembling the decoded bytes into one or more bytes so that the decoded bytes have the same value they had before the encoding process.

Base 64 decoder 930 stops requesting bytes for two reasons: because a sufficient number of base 64-encoded bytes have been received to decode a single character in the context of a shift character having been received, or because a shift unlock is received in the context of a shift lock having been received. In the context of a shift character having been received, range and lock state storage 822 will have a shift lock state with a value indicating "off" and base 64 decoder 930 will request enough bytes to decode a character plus one byte to advance the current character past the last decoded byte. In the context of a shift lock having been received, range and lock state storage 822 will have a shift lock state with a value indicating "on" and base 64 decoder 930 will request and decode additional bytes until a character corresponding to a shift unlock is received. This shift unlock character may be any express or implied character that was used to encode an express or implied shift unlock as long as the sender system and recipient system use the same characters to identify an unlock. In one embodiment, an express unlock character is an ASCII '−' and an implied unlock character is any character not in Table 1. Base 64 decoder 930 provides the characters decoded to output 840.

Decoding Method—General

Figure 10:
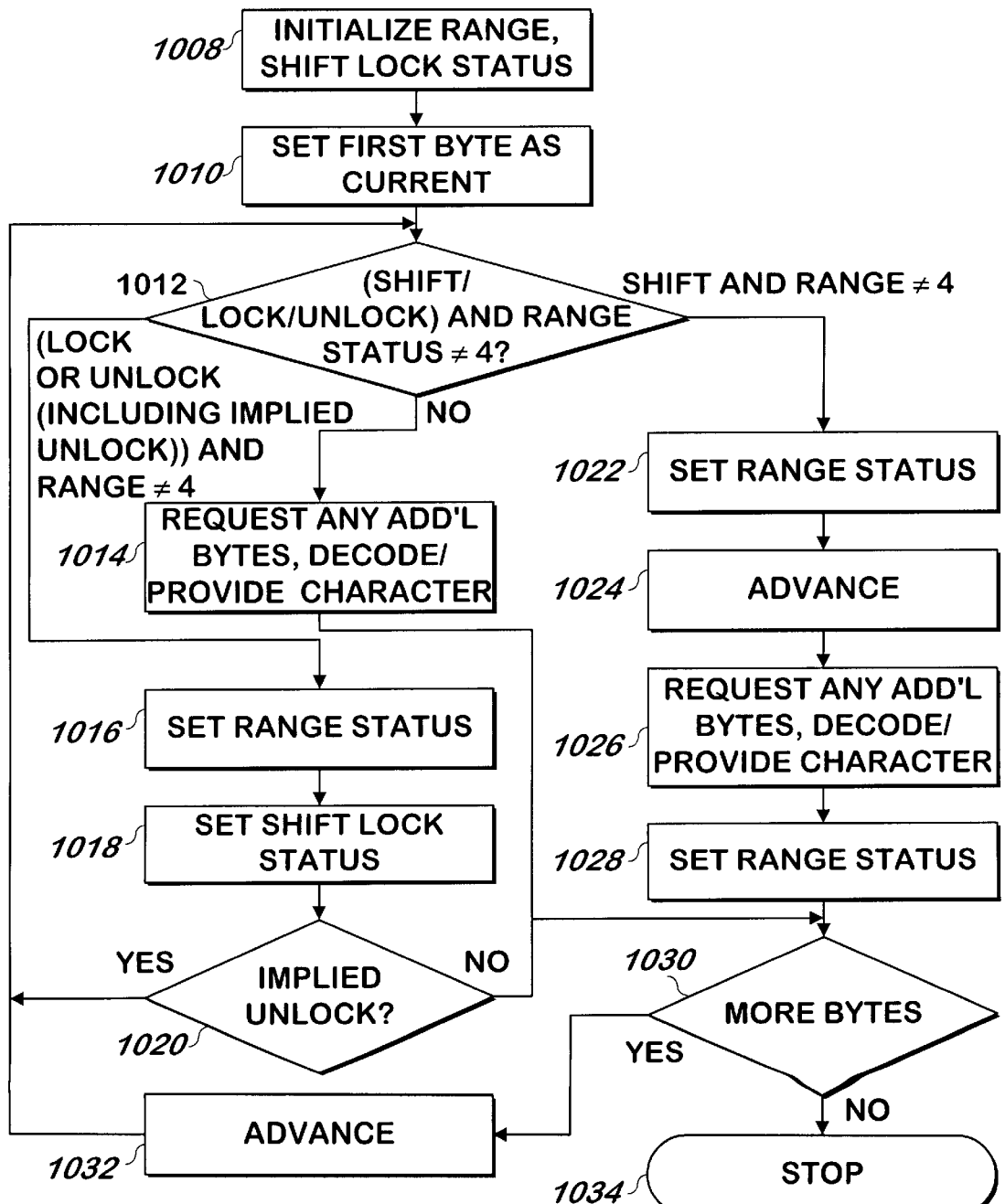
FIG. 10 is a flowchart illustrating a method of decoding characters and shift, shift lock and shift unlock characters according to one embodiment of the present invention.

Referring now to FIG. 10, a method of decoding a sequence of bytes to produce characters is shown according to one embodiment of the present invention. Variables for range status and shift lock status are initialized 1008 to "1" and "off" respectively. In one embodiment, "off" is represented by a value of zero. The first byte is received 1010 and may be referred to as the "current byte".

The current byte is tested 1012 to determine whether it is a shift, shift lock or shift unlock character, including "implied unlock" characters described below, and that the range status variable is not in range 4. In one embodiment, shift and shift lock characters are those characters listed in Table 2A, 2B or 2C, although other shift and shift lock characters may be used. In one embodiment, the shift unlock character is the ASCII character '−' and may be an "implied unlock" when a byte is received not having an encoded value listed in Table 1, although characters other than the ASCII encoding for '−' may be used to represent an explicit unlock.

If the current byte is a lock or unlock character, including an implied unlock character if the shift lock status variable is on, and the range status variable is not equal to 4, the range status and shift lock status variables are set 1018 per table 2A, 2B or 2C or other values. In the case of a shift lock character, setting the variables is accomplished by either replacing the values of the range and shift lock variables or by pushing them onto a stack. In the case of a shift unlock character, the range variable is set to '1' and shift lock status variable is set to "off" in one embodiment, or both values are popped from a stack in another embodiment.

If the current byte is an implied unlock character 1020, the method continues at the testing step 1012 so that the implied unlock character can be properly interpreted using the range and shift lock status variables set in steps 1016 and 1018 described above. Otherwise, the method continues at step 1030.

If the current byte tested in step 1012 is not shift, lock or unlock character, or the range status variable is equal to 4, the current byte, as well as any additional bytes following the current byte are decoded into a character 1014 based on the state of the range status variable using Table 2A, 2B or 2C as described above. In the case of the range status variable having an indicator indicating the character is in range 6, in one embodiment the decoding step 1014 involves decoding one or more characters until an encoded byte is received not having an encoded value in Table 1. In another embodiment, the decoding step 1014 involves decoding a sufficient number of bytes until an encoded byte is received not having an encoded value in Table 1 or the decoded character boundary is on a byte boundary. The method continues at step 1030.

If the current character tested in step 1012 is a shift character and the range status variable is not equal to 4, the range status is set 1022 per table 2A, 2B, or 2C, or other values, either by replacing it or by pushing it onto a stack and the next byte received after the shift character is advanced to become the current byte. The current byte and any necessary additional bytes are received until a single character is decoded and provided 1026, and the character decoded is provided. The range status is set 1028 either by setting the range status variable to '1' or by popping it from a stack described above, and the method continues at step 1030. In another embodiment, step 1022 sets a separate range status variable, a shift range status variable, used to decode the character in step 1026 and step 1028 is not used.

If additional bytes exist 1030, the next byte received following the byte most recently used in steps 1014 or 1026 or 1016 and 1018 as described herein is advanced 1032 to become the current byte and the method repeats at step 1012. If there are no additional bytes, the method terminates 1034.

Characters provided in steps 1014 or 1026 may be converted from a UCS-2 character into a UCS-4 character by appending a value of 0x0000 to the most significant bytes as a part of the decoding process for characters in all ranges in one embodiment, or characters in all ranges except range 6 in another embodiment.

Decoding Method—Characters

Figure 11:
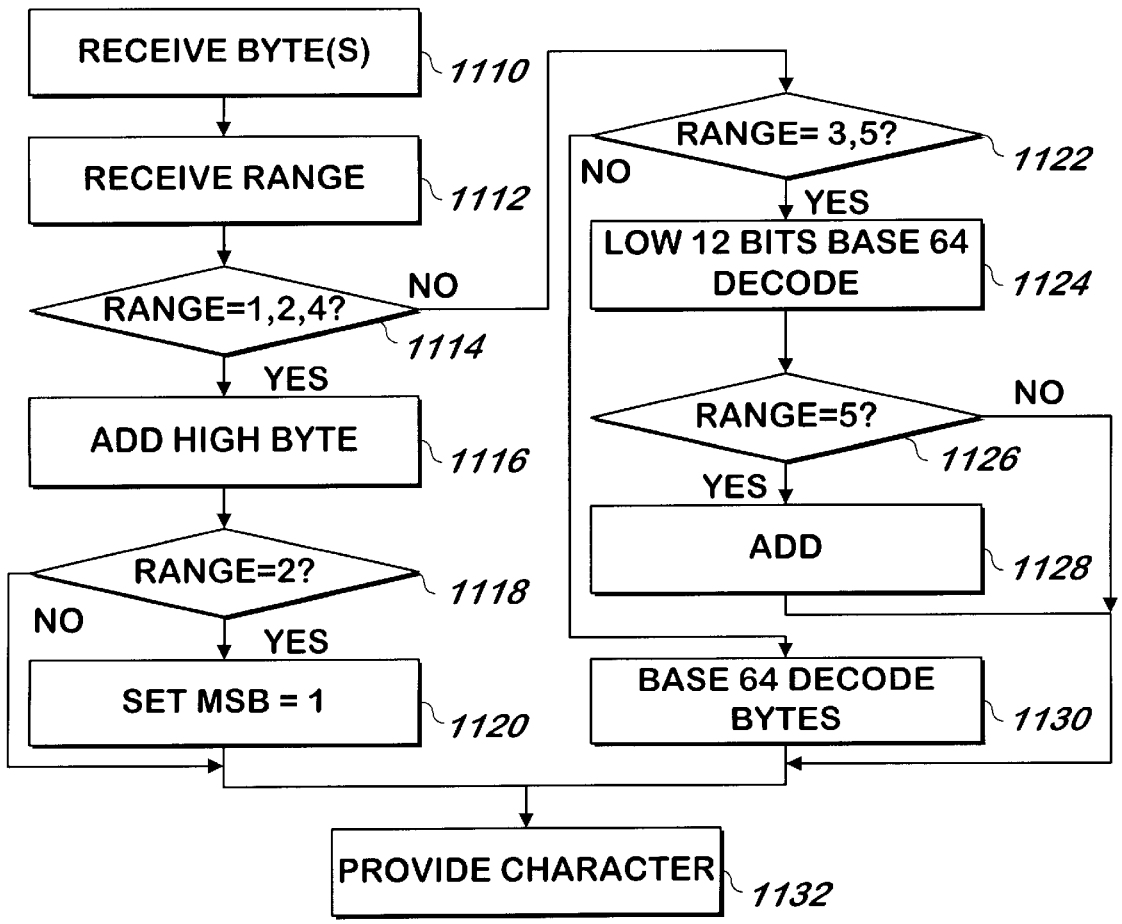
FIG. 11 is a flowchart illustrating a method of decoding a character according to one embodiment of the present invention.

Characters are decoded using the current byte and, if necessary, additional bytes advanced to become the current byte. Referring now to FIG. 11, a method of decoding one or more bytes into a character according to one embodiment of the present invention is shown. One or more bytes that form a character are received 1110 along with the range state variable described above 1112. If the range is 1, 2 or 4, 1114 a single byte is received in step 1110 and an additional most significant byte of 0x00 is added to produce a two byte character 1116. If the range is 2 1118, the most significant bit of the least significant byte of the two byte character produced in step 1116 is set to '1' 1120.

If the range of the state variable is 3 or 5 1122, two bytes are low 12 bits base 64 decoded 1124 as described above to produce a two byte character as described above. If the range state variable is 5, a value is added 1128 to the character decoded in step 1124. The value may be any number, such as 0x1B00 or 0x1E00 as described above. In one embodiment, range 5 is divided into two subranges, and the value to add it 0x1000 for the first subrange and 0x2000 for the second subrange. The subranges may be designated in the range state variable using a value of 5 to signify the first subrange and a value of 7 to signify the second subrange.

If the range is 6, bytes received in step 1110 are base 64 decoded into a two byte UCS-2 or four byte UCS-4 character 1130 as described above.

The character produced using the method of the present invention is provided 1132, either as produced as described above, or by adding a two most significant bytes of 0x0000 to convert a UCS-2 character into a UCS-4 character for characters in all ranges in one embodiment, or for characters in all ranges except range 6 in another embodiment where all four bytes of UCS-4 characters were encoded in range 6.

TABLE 2A-continued

| Range Number | Current Character | Shift Character | Shift Lock Character | Character Encoding |
|---|---|---|---|---|
| | 0x007F (Except values in prohibited set) | | | of current character |
| 2 | 0x0080 to 0x00FF except for resulting values in prohibited set | '%' | Not Allowed | Low byte of current character with MSB masked to zero |
| 3 | 0x0000-0x0FFF | '&' | '*' | Low 12 bits base 64 encoding of current character |
| 4 | ASCII characters used for shift, shift lock | '&' | Not Allowed | Low byte of current character |
| 5 | 0x1E00-0x2DFF | '#' | Not Allowed | Low 12 bits base 64 encoding of (current character - 0x1E00) |
| 6 | Any other character | Not Allowed | '+' | base 64 encoding |

TABLE 1

All values in Decimal

| Decode i.e. ASCII Code | ASCII Glyph | Encode i.e. ASCII code base 64 Encoded | Decode i.e. ASCII Code | ASCII Glyph | Encode i.e. ASCII code base 64 Encoded | Decode i.e. ASCII Code | ASCII Glyph | Encode i.e. ASCII code base 64 Encoded | Decode i.e. ASCII Code | ASCII Glyph | Encode i.e. ASCII code base 64 Encoded |
|---|---|---|---|---|---|---|---|---|---|---|---|
| 65 | A | 0 | 82 | R | 17 | 105 | i | 34 | 122 | z | 51 |
| 66 | B | 1 | 83 | S | 18 | 106 | j | 35 | 48 | 0 | 52 |
| 67 | C | 2 | 84 | T | 19 | 107 | k | 36 | 49 | 1 | 53 |
| 68 | D | 3 | 85 | U | 20 | 108 | l | 37 | 50 | 2 | 54 |
| 69 | E | 4 | 86 | V | 21 | 109 | m | 38 | 51 | 3 | 55 |
| 70 | F | 5 | 87 | W | 22 | 110 | n | 39 | 52 | 4 | 56 |
| 71 | G | 6 | 88 | X | 23 | 111 | o | 40 | 53 | 5 | 57 |
| 72 | H | 7 | 89 | Y | 24 | 112 | p | 41 | 54 | 6 | 58 |
| 73 | I | 8 | 90 | Z | 25 | 113 | q | 42 | 55 | 7 | 59 |
| 74 | J | 9 | 97 | a | 26 | 114 | r | 43 | 56 | 8 | 60 |
| 75 | K | 10 | 98 | b | 27 | 115 | s | 44 | 57 | 9 | 61 |
| 76 | L | 11 | 99 | c | 28 | 116 | t | 45 | 43 | + | 62 |
| 77 | M | 12 | 100 | d | 29 | 117 | u | 46 | 47 | / | 63 |
| 78 | N | 13 | 101 | e | 30 | 118 | v | 47 | | | |
| 79 | O | 14 | 102 | f | 31 | 119 | w | 48 | | | |
| 80 | P | 15 | 103 | g | 32 | 120 | x | 49 | | | |
| 81 | Q | 16 | 104 | h | 33 | 121 | y | 50 | | | |

TABLE 2A

| Range Number | Current Character | Shift Character | Shift Lock Character | Character Encoding |
|---|---|---|---|---|
| 1 | 0x000 to | None | None | Low byte |

TABLE 2B

| 1 | 0x000 to 0x007F (Except values in | None | None | Low byte of current character |
|---|---|---|---|---|

TABLE 2B-continued

| | | | | |
|---|---|---|---|---|
| | prohibited set) | | | |
| 2 | 0x0080 to 0x00FF except for resulting values in prohibited set | '%' | Not Allowed | Low byte of current character with MSB masked to zero |
| 3 | 0x0000-0x0FFF | '&' | '*' | Low 12 bits base 64 encoding of current character |
| 4 | ASCII characters used for shift, shift lock | '&' | Not Allowed | Low byte of current character |
| 5 | 0x1B00-0x2AFF | '#' | Not Allowed | Low 12 bits base 64 encoding of (current character - 0x1B00) |
| 6 | Any other character | Not Allowed | '+' | base 64 encoding |

TABLE 2C

| Range Number | Current Character | Shift Character | Shift Lock Character | Character Encoding |
|---|---|---|---|---|
| 1 | 0x000 to 0x007F (Except values in prohibited set) | None | None | Low byte of current character |
| 2 | 0x0080 to 0x00FF except for resulting values in prohibited set | '%' | Not Allowed | Low byte of current character with MSB masked to zero |
| 3 | 0x0000-0x0FFF | '&' | '*' | Low 12 bits base 64 encoding of current character |
| 4 | ASCII characters used for shift, shift lock | '&' | Not Allowed | Low byte of current character |
| 5A | 0x1000-0x1FFF and | # | | Low 12 bits base 64 encoding of (current character - 0x1000) |
| 5B | 0x2000-0x2FFF | $ | | Low 12 bits base 64 encoding of (current character - 0x1000) |
| 6 | Any other character | Not Allowed | '+' | base 64 encoding |

What is claimed is:

1. A system for encoding a plurality of characters received at an input, each character comprising at least one byte and having a range, to produce at an output a plurality of encoded characters, each comprising at least one byte comprising eight bits, the system comprising:

a character encoder having a first input coupled to a system input for receiving at least a portion of a first character, and having a second input for receiving an indicator of a range of the first character, the character encoder for building and providing at a character encoder output coupled to the system output an encoded character comprising at least one byte responsive to at least a portion of the character portion received at the first input and at least a portion of the indicator received at the second input;

a range and multiple detect device having a first input coupled to the system input to receive at least a portion of the first character, the range and multiple detect device for determining a similarity of the range of the first character and a range of an adjacent character, and providing an indicator of the range of the first character to at least one first output responsive to an absence of similarity of the range of the first character and an adjacent character, and for providing an indicator of the range of the first character to at least one second output responsive to a similarity of the range of the first character and an adjacent character;

a shift character builder having an input coupled to the range and multiple detect device first output to receive the indicator of the range of the first character for selecting a shift character from a plurality of shift characters responsive to the input and providing said shift character at an output coupled to the system output; and a shift lock character builder having an input coupled to the range and multiple detect device second output to receive the range of the first character responsive to the range of the first character equal to the range of an adjacent character, the shift lock character builder for selecting a shift lock character from a plurality of shift characters responsive to range indicator received at the shift lock character builder input and providing said shift lock character at an output coupled to the system output.

2. The system of claim 1 wherein each of the at least one byte of the encoded characters has a most significant bit having a first state and a second state and each of the at least one byte of at least one of the encoded characters built by the character encoder have the most significant bit in the first state.

3. The system of claim 2 wherein the character encoder comprises a low 12 bits base 64 encoder having a first input coupled to receive at least two sets of six of the bits of the first character, the low 12 bits base 64 encoder for encoding and providing at an output coupled to the character encoder output each of the sets of six bits of the first character into a base 64 encoded character responsive to a second input coupled to the first output of the range and multiple detect device.

4. The system of claim 3 wherein the character encoder additionally comprises a subtractor having an input coupled to receive the first character and an output coupled to the low 12 bits base 64 encoder input, the subtractor for subtracting a value from the character received at the input to produce a subtracted character and provide the subtracted character at the output responsive to a second input coupled to the first output of the range and multiple detect device.

5. The system of claim 4 wherein the value is selected from at least one of 0x1B00, 0x1E00, 0x1000 and 0x 2000.

6. The system of claim 2 wherein the character encoder comprises a bit 8 masker having a first input coupled to receive at least a portion of the first character and provide at an output coupled to the character encoder output the encoded character having one byte comprising a most significant bit having a first state, and a set of seven least significant bits having a value responsive to seven least significant bits of the first character responsive to a second input coupled to the first output of the range and multiple detect device.

7. The system of claim 1 wherein the character encoder comprises a base 64 encoder having a first input coupled to receive at least a portion of the first character, the base 64 encoder for base 64 encoding the portion of the first character to produce the encoded character comprising at least three bytes and providing at an output coupled to the character encoder output the encoded character responsive to a second input coupled to the first input of the range and multiple detect device.

8. The system of claim 1 additionally comprising an ASCII forwarder having an input coupled to receive at least a portion of the first character, the ASCII forwarder for providing at an output coupled to the apparatus output a single byte comprising a set of seven least significant bits of the first character.

9. The system of claim 1 additionally comprising a state storage coupled to the range and multiple detect device comprising a prior character range storage for storing the range of a second character preceding the first character.

10. The system of claim 9 wherein the state storage additionally comprises a shift lock storage for storing at least one state corresponding to a shift lock provided at the output of the shift lock character builder.

11. The system of claim 1 wherein the range and multiple detect device additionally has a second input coupled to the system input to receive at least a portion of a second character following the first character.

12. The system of claim 1 wherein the range and multiple detect device comprises a lookup table, and the range and multiple detect device provides to at least one first output an indicator of the range of the first character responsive to the lookup table.

13. A method of encoding a plurality of characters comprising a first character comprising two bytes and a second character comprising two bytes, the method comprising:
  generating a first shift character;
  encoding the first character responsive to a first encoding function;
  generating a shift lock character different from the first shift character; and
  encoding the second character responsive to a second encoding function.

14. The method of claim 13 wherein
  the first encoding function corresponds to the shift character;
  the second encoding function corresponds to the shift lock character; and
  the method comprises the additional step of encoding a third character using the second encoding function.

15. The method of claim 14 comprising the additional steps of:
  identifying a range of the first character;
  identifying a range of the second character; and
  wherein
  encoding the first character is responsive to the range of the first character; and
  encoding the second character is responsive to the range of the second character.

16. The method of claim 15 wherein:
  identifying the range of the first character step comprises comparing the first character with a plurality of values in a lookup table; and
  identifying the range of the second character step comprises comparing the second character with a plurality of values in the lookup table.

17. The method of claim 15 wherein:
  the generating the first shift character step is responsive to the range of the first character; and
  the generating the shift lock character is responsive to the range of the second character.

18. The method of claim 13 wherein encoding the first character comprises subtracting a value from the first character to produce a subtracted result and low 12 bits base 64 encoding a least twelve significant bits of the subtracted result.

19. The method of claim 13 wherein encoding the second character comprises encoding the character by base 64 encoding at least a portion of the second character.

20. The method of claim 13 wherein encoding the second character comprises encoding the character by low 12 bits base 64 encoding a least 12 significant bits of the second character.

21. The method of claim 13 wherein the encoding the first character step comprises providing a first byte of the two bytes of the first character.

22. The method of claim 21 wherein encoding the first character comprises clearing a most significant bit of the first byte of the first character.

23. The method of claim 13 wherein encoding the first character comprises encoding the first character by low 12 bits base 64 encoding a least 12 significant bits of the character.

24. A computer program product having a computer useable medium having computer readable program code embodied therein for encoding a plurality of characters comprising a first character comprising two bytes and a second character comprising two bytes, the computer program product comprising:
  computer readable program code devices configured to cause a computer to generate a first shift character;
  computer readable program code devices configured to cause a computer to encode the first character responsive to a first encoding function;
  computer readable program code devices configured to cause a computer to generate a shift lock character different from the first shift character; and
  computer readable program code devices configured to cause a computer to encode the second character responsive to a second encoding function.

25. The computer program product of claim 24 wherein the first encoding function corresponds to the shift character;

the second encoding function corresponds to the shift lock character; and the computer program product additionally comprises computer readable program code devices configured to cause a computer to encode a third character using the second encoding function.

26. The computer program product of claim 25 additionally comprising:

computer readable program code devices configured to cause a computer to identify a range of the first character;

computer readable program code devices configured to cause a computer to identify a range of the second character; and wherein the computer readable program code devices configured to cause a computer to encode the first character are responsive to the range of the first character; and computer readable program code devices configured to cause a computer to encode the second character are responsive to the range of the second character.

27. The computer program product of claim 26 wherein:

the computer readable program code devices configured to cause a computer to identify the range of the first character step comprise computer readable program code devices configured to cause a computer to compare the first character with a plurality of values in a lookup table; and the computer readable program code devices configured to cause a computer to identify the range of the second character step comprise computer readable program code devices configured to cause a computer to compare the second character with a plurality of values in the lookup table.

28. The computer program product of claim 26 wherein:

the computer readable program code devices configured to cause a computer to generate the first shift character are responsive to the range of the first character; and the computer readable program code devices configured to cause a computer to generate the shift lock character are responsive to the range of the second character.

29. The computer program product of claim 24 wherein computer readable program code devices configured to cause a computer to encode the first character comprises computer readable program code devices configured to cause a computer to subtract a value from the first character to produce a subtracted result and low 12 bits base 64 encoding a least twelve significant bits of the subtracted result.

30. The computer program product of claim 24 wherein computer readable program code devices configured to cause a computer to encode the second character comprise computer readable program code devices configured to cause a computer to encode the character by base 64 encoding at least a portion of the second character.

31. The computer program product of claim 24 wherein computer readable program code devices configured to cause a computer to encode the second character comprise computer readable program code devices configured to cause a computer to encode the character by low 12 bits base 64 encoding a least 12 significant bits of the second character.

32. The method of claim 24 wherein the computer readable program code devices configured to cause a computer to encode the first character comprise computer readable program code devices configured to cause a computer to provide a first byte of the two bytes of the first character.

33. The computer program product of claim 32 wherein the computer readable program code devices configured to cause a computer to encode the first character comprise computer readable program code devices configured to cause a computer to clear a most significant bit of the first byte of the first character.

34. The computer program product of claim 24 wherein computer readable program code devices configured to cause a computer to encode the first character comprise computer readable program code devices configured to cause a computer to encode the first character by low 12 bits base 64 encoding a least 12 significant bits of the character.

35. A system for decoding at least one encoded character, each character comprising a plurality of bits, received at an apparatus input to produce at least one first decoded character at an apparatus output, the apparatus comprising:

a shift decoder having an input coupled to an apparatus input for receiving and decoding a plurality of the bits comprising a shift character having a range, and for providing at an output a first range identifier corresponding to the range;

a shift lock decoder having an input coupled to the apparatus input for receiving and decoding a plurality of the bits comprising a shift lock character having a range, and for providing at an output a second range identifier corresponding to the range; and a character decoder having a first input coupled to the apparatus input to receive a plurality of the bits comprising at least one encoded character and at least one second input coupled to the shift lock decoder and the shift decoder for receiving a range identifier selected from the first range identifier and the second range identifier at a second input coupled to at least one of the shift lock decoder output and the shift decoder output, the character decoder for providing at an output coupled to an apparatus output a decoded character responsive to at least one of the bits comprising at least one encoded character received at the first character decoder input and at least a portion of the range identifier received at the second character decoder input.

36. The system of claim 35 wherein the character decoder comprises at least one of:

an ASCII decoder having a first input coupled to the first character decoder input for receiving an encoded character and providing at an output coupled to the system output a second decoded character comprising the encoded character and at least one byte having a value of zero, responsive to a second input coupled to the second character encoder input;

a low 12 bits base 64 decoder having an input coupled to the first character decoder input for receiving at least two sets of bits, the low 12 bits base 64 decoder for low 12 bits base 64 decoding the at least two sets of bits to produce at least two sets of six decoded bits per set of bits, and for providing at an output coupled to the system output a second decoded character comprising the at least two sets of decoded bits and at least one bit cleared to zero, responsive to a second input coupled to the second character encoder input; and a base 64 decoder having a first input coupled to the first character decoder input for receiving a set of at least thirteen of the bits, the base 64 decoder for base 64 decoding the bits received at the first input to produce at least one second decoded character and providing at an output coupled to the system output the at least one second decoded character, responsive to a second input coupled to the second character encoder input.

37. The system of claim 36 wherein the character decoder comprises at least two of the ASCII decoder, the low 12 bits base 64 decoder and the base 64 decoder; and the first decoded character comprises the second decoded character.

38. The system of claim 37 wherein the character decoder comprises the ASCII decoder, the low 12 bits base 64 decoder and the base 64 decoder; and the first decoded character comprises the second decoded character.

39. The system of claim 36 wherein the character encoder additionally comprises an adder coupled between the low 12 bits base 64 decoder output and the system output, having a first input coupled to the low 12 bits base 64 decoder output to receive the second decoded character, the adder for adding a value to the decoded character to produce a first decoded character and providing the first decoded character to an output coupled to the system output responsive to a second input coupled to the second character encoder input.

40. The system of claim 36 wherein the character encode additionally comprises an unmasker coupled between the ASCII decoder and the system output, having an input coupled to the ASCII decoder output to receive the second decoded character, the unmasker for setting a bit in the decoded character received to produce the first decoded character and for providing the first decoded character to an output responsive to a second input coupled to the second character encoder input.

41. The system of claim 36 wherein the first decoded character comprises the second decoded character.

42. A method of decoding a plurality of characters from a plurality of bytes comprising:

identifying a shift lock character from the plurality of bytes, the shift lock character having a range;

decoding at least two first characters responsive to the range of the shift lock character; and identifying a shift character from the plurality of bytes.

43. The method of claim 42 wherein the decoding step comprises:

receiving at least two of the bytes comprising at least 12 bits; and low 12 bits base 64 decoding the at least 12 bits of the two bytes received to generate a character comprising two decoded bytes.

44. The method of claim 43 wherein the decoding step additionally comprises providing at least two bytes comprising sixteen bits, each bit having a same value.

45. The method of claim 42 wherein the decoding step comprises:

receiving at least three of the bytes; and base 64 decoding the at least three bytes received to generate a decoded character comprising two bytes.

46. The method of claim 45 wherein the decoding step additionally comprises providing at least two bytes comprising sixteen bits, each bit having a same value.

47. The method of claim 42 comprising the additional step of decoding a second character responsive to a range of the shift character identified.

48. The method of claim 47 wherein the decoding a second character step comprises:

receiving one of the bytes;

providing a second byte comprising bits, each of the bits having a same value; and building a character comprising the byte received and the second byte.

49. The method of claim 48 comprising the additional step of setting to a value a most significant bit of the byte received.

50. The method of claim 47 wherein each of the bytes comprises eight bits and the decoding a second character step comprises:

receiving at least twelve bits of at least two of the bytes; and low 12 bits base 64 decoding twelve of the bits received to generate the second character comprising two bytes.

51. The method of claim 50 comprising the additional step of adding a value to the at least twelve bits received.

52. The method of claim 51 wherein the value is selected from 0x1000, 0x1B00, 0x1E00 and 0x2000.

53. The method of claim 47 wherein the decoding a second character step comprises:

receiving at least three of the bytes; and base 64 decoding the at least three bytes received to generate the second character comprising two bytes.

54. The method of claim 53 wherein decoding a second character step additionally comprises providing at least two bytes comprising sixteen bits, each bit having a same value.

55. A computer program product having a computer useable medium having computer readable program code embodied therein for decoding a plurality of characters from a plurality of bytes, the computer program product comprising:

computer readable program code devices configured to cause a computer to identify a shift lock character from the plurality of bytes, the shift lock character having a range;

computer readable program code devices configured to cause a computer to decode at least two first characters responsive to the range of the shift lock character; and computer readable program code devices configured to cause a computer to identify a shift character from the plurality of bytes.

56. The computer program product of claim 55 wherein the computer readable program code devices configured to cause a computer to decode comprise:

computer readable program code devices configured to cause a computer to receive at least two of the bytes comprising at least 12 bits; and computer readable program code devices configured to cause a computer to low 12 bits base 64 decode the at least 12 bits of the two bytes received to generate a character comprising two decoded bytes.

57. The computer program product of claim 56 wherein computer readable program code devices configured to cause a computer to decode additionally comprise computer readable program code devices configured to cause a computer to provide at least two bytes comprising sixteen bits, each bit having a same value.

58. The computer program product of claim 55 wherein the computer readable program code devices configured to cause a computer to decode comprise:

computer readable program code devices configured to cause a computer to receive at least three of the bytes; and computer readable program code devices configured to cause a computer to base 64 decode the at least three bytes received to generate a decoded character comprising two bytes.

59. The computer program product of claim 58 wherein the computer readable program code devices configured to cause a computer to decode additionally comprises computer readable program code devices configured to cause a computer to provide at least two bytes comprising sixteen bits, each bit having a same value.

60. The computer program product of claim 55 additionally comprising computer readable program code devices configured to cause a computer to decode a second character responsive to a range of the shift character identified.

61. The computer program product of claim 60 wherein the computer readable program code devices configured to cause a computer to decode a second character comprise:

computer readable program code devices configured to cause a computer to receive one of the bytes;

computer readable program code devices configured to cause a computer to provide a second byte comprising bits, each of the bits having a same value; and computer readable program code devices configured to cause a computer to build a character comprising the byte received and the second byte.

62. The computer program product of claim 61 additionally comprising computer readable program code devices configured to cause a computer to set to a value a most significant bit of the byte received.

63. The computer program product of claim 60 wherein each of the bytes comprises eight bits and the computer readable program code devices configured to cause a computer to decode a second character comprise:

computer readable program code devices configured to cause a computer to receive at least twelve bits of at least two of the bytes; and computer readable program code devices configured to cause a computer to low 12 bits base 64 decode twelve of the bits received to generate the second character comprising two bytes.

64. The computer program product of claim 63 additionally comprising computer readable program code devices configured to cause a computer to add a value to the at least twelve bits received.

65. The computer program product of claim 64 wherein the value is selected from 0x1000, 0x1B00, 0x1E00 and 0x2000.

66. The computer program product of claim 60 wherein the computer readable program code devices configured to cause a computer to decode a second character comprise:

computer readable program code devices configured to cause a computer to receive at least three of the bytes; and computer readable program code devices configured to cause a computer to base 64 decode the at least three bytes received to generate the second character comprising two bytes.

67. The computer program product of claim 66 wherein the computer readable program code devices configured to cause a computer to decode the second character additionally comprises computer readable program code devices configured to cause a computer to provide at least two bytes comprising sixteen bits, each bit having a same value.

* * * * *